(12) United States Patent
Choate

(10) Patent No.: US 9,243,719 B1
(45) Date of Patent: Jan. 26, 2016

(54) SAFETY RELIEF VALVE

(71) Applicant: Jeremy Ryan Choate, Carencro, LA (US)

(72) Inventor: Jeremy Ryan Choate, Carencro, LA (US)

( * ) Notice: Subject to any disclaimer, the term of this patent is extended or adjusted under 35 U.S.C. 154(b) by 71 days.

(21) Appl. No.: 14/067,876

(22) Filed: Oct. 30, 2013

(51) Int. Cl.
*F16K 1/12* (2006.01)
*F16K 17/04* (2006.01)

(52) U.S. Cl.
CPC ........... *F16K 17/04* (2013.01); *Y10T 137/7922* (2015.04)

(58) Field of Classification Search
CPC .............. F16K 17/04; Y10T 137/7922; Y10T 137/7929
USPC .................. 137/528, 540, 543.13, 543.15
See application file for complete search history.

(56) References Cited

U.S. PATENT DOCUMENTS

2002/0189680 A1* 12/2002 Choate et al. ................. 137/469

* cited by examiner

*Primary Examiner* — Kevin Lee
*Assistant Examiner* — P. Macade Nichols

(57) ABSTRACT

An adjustable safety relief valve is provided for use on a pressure vessel or a flow line with a pressurized fluid therein. In the preferred embodiment, the safety relief valve comprises a body with a closed bonnet and a chamber therein and an inlet and an outlet; the inlet including a valve seat; a disk member with an attached stem member closable on the valve seat; a mechanism in the body biasing the disk member to rest on the valve seat; a guide member supported in the bonnet to guide and limit disk member movement; and a skirt member affixed to the body, which surrounds the disk member and defines a uniform flow area with the inlet. The presented safety relief valve has improvements, which remove detriments to disk member movement and function, resulting in a safety relief valve with predictable performance and improved reliability.

10 Claims, 6 Drawing Sheets

SAFETY RELIEF VALVE

BACKGROUND

The present invention relates to safety relief valves for use with gases or liquids on a pressurized system, such as pressure vessel or a flow line.

Safety relief valves are commonly used on pressure vessels or pipelines to relieve temporary pressure surges in excess of the safe pressure the vessel or pipeline can withstand. Safety relief valves have the advantage of responding very quickly to pressure changes in pressurized systems to which they are attached. Safety relief valves move to a fully open position almost immediately after the pressure within the system rises above a user-determined set pressure. This allows excess fluid pressure to escape quickly. Then, when sufficient pressure has escaped, safety relief valves quickly move back to a closed position. For an example of a safety relief valve, see U.S. Pat. No. 4,932,434, which is herein incorporated by reference in its entirety.

Existing safety relief valves do, however, have some problems. One problem is that fluid flowing through a safety relief valve must change direction inside the valve body due to the valve body outlet being located at a ninety degree angle in relation to the valve inlet. The redirection of flow causes internal moveable parts to shift towards the valve body outlet during valve cycling, resulting in interference between the moveable parts and related stationary guide members. Part shifting causes the guide surfaces of parts to rub together resulting in damage, such as galling, to occur on the guide surfaces. Galling can be defined as a condition where excessive friction between sections on two mating parts results in localized welding with subsequent splitting and a further roughening of the rubbing surfaces of one or both of the two mating parts. Part shifting also causes problems when the valve closes. As the moveable parts attempt to realign with the inlet upon valve closure, undesirable impact occurs between the face of the moveable parts and the inlet resulting in impact damage to the parts.

See, for example, the safety relief valves described in U.S. Pat. No. 4,799,506 (hereinafter the '506 patent), which is herein incorporated by reference in its entirety, and U.S. Pat. No. 8,413,955 (hereinafter the '955 patent), which is herein incorporated by reference in its entirety. In these designs, a disk member rests upon a valve seat on an inlet with a stem member attached to the disk member. The stem member provides guidance to the disk member, and a guide member with an internal longitudinal guide bore acts to provide guidance to the stem member. This type of disk member guidance arrangement is preferable, since the guide surfaces are located away from the general path of flow, which lessens the possible build-up of foreign particles between the guiding members. When the disk member is removed from the valve seat, fluid escapes and exits the valve body through the outlet, which is located at a ninety degree angle in relation to the inlet. The redirection of fluid from the inlet towards the outlet shifts the disk member and stem member towards the valve body outlet. The shifting of the disk member towards the outlet creates detrimental contact between the stem member and the guide bore during valve cycling. Disk member shifting towards the outlet, coupled with repeated cycling of the disk member, causes damage to the stem member and the guide bore. In a worst case scenario, the stem member material may yield or fail. Damage to the members is exacerbated during high pressure venting cycles, due to the increase in contact force between the stem member and the guide bore created by high-powered flow forces exiting the valve body outlet. In the '506 and '955 patents, the stem member serves as the main means of guidance for the disk member when the disk member is removed from the valve seat, and close fit tolerances are necessary between the stem member and the guide bore for repeatable valve performance. Any damage on the stem member or guide bore can interfere with the cycling of the disk member, thereby changing valve opening and closing characteristics, which makes valve performance less predictable.

The shifting of the disk member towards the outlet also creates a problem when the valve closes. As the disk member attempts to realign with the inlet upon valve closure, undesirable contact occurs between the spherical sealing surface of the disk member and the top surface of the valve seat. The repeated realignment of the disk member with the valve seat during valve closing results in damage on the disk member due to repeated impact. This is especially undesirable, since the spherical face of the disk member is used in combination with the valve seat to provide a valve seal at the inlet. Disk member damage at the spherical sealing surface will result in the valve continuously leaking pressurized fluid from the inlet.

Another problem with existing safety relief valves is that they tend to utilize a sliding-fit disk member and skirt member design with the skirt member providing disk member guidance. See, for example, the safety relief valves described in U.S. Pat. No. 2,597,057 (hereinafter the '057 patent), which is herein incorporated by reference in its entirety, and U.S. Pat. No. 5,341,838 (hereinafter the '838 patent), which is herein incorporated by reference in its entirety. In the '057 and '838 patents, when the disk member is raised from an inlet so that fluid escapes, a portion of the skirt member obstructs the flow path as fluid flows around a blow-down control mechanism on the inlet, so that the fluid accumulates above the disk member in a closed bonnet. As fluid moves around the disk member and into the bonnet, foreign fluid particles accumulate between the sliding surfaces of the disk member and the skirt member. The closely fitted outer diameter of the disk member and inner diameter of the skirt member serve to guide the disk member and control the time it takes for fluid from the inlet to enter and exit the closed bonnet. This condition is used to control the blow-down value of the valve, but in doing so, the sliding-fit parts are coated with contaminates from the fluid. The build-up of foreign particles from contaminated fluids causes interference with disk member movement. This interference can affect the amount of inlet pressure needed to operate the valve, thereby changing valve opening and closing characteristics, which makes valve performance less reliable.

In addition to the above-mentioned problems, safety relief valves can vary in quality in a number of ways. Different safety relief valves vary in their ability to attain high coefficients of flow, their performance reliability, their durability, their cost to manufacture, and their ease of use.

SUMMARY OF THE INVENTION

A safety relief valve has been invented that addresses problems left unsolved by prior valves. Namely, a safety relief valve has been invented that incorporates components in the design to stop disk member shifting towards the outlet during valve venting cycles, which prevents damage to the disk member and related guide members, while providing disk member guidance without reliance on a sliding-fit skirt member and disk member design. The resulting safety relief valve has improved reliability in disk member movement and function, which makes valve performance more predictable. Disk member cycle life is increased, which extends the service life of the safety relief valve and leads to a decreased need for valve maintenance and repair.

It has been discovered that a safety relief valve utilizing a valve housing with a closed bonnet, chamber, and outlet, a disk member with an attached stem member, a guide member with a longitudinal guide bore, a fixed skirt member, and an inlet base, can create a uniform annular area of flow between the skirt member and the inlet base, which generates a uniform pressure environment in the closed bonnet. The uniform pressure environment surrounds the disk member and stem member and centers the moveable disk member and stem member in relation to the longitudinal guide bore during valve cycling. The uniform annular area of flow directs flow from the closed bonnet and flow beneath the disk member to exit in a uniform and axial direction 180 degrees opposite the inlet flow and into a chamber in the lower valve housing, thereby removing any sideways outlet flow forces from acting on the disk member and stem member. The disk member and stem member do not shift towards the valve outlet during valve opening and closing cycles. The removal of detrimental contact between the stem member and guide bore as the disk member travels, results in the prevention of damage to the stem member and the guide bore. The elimination of damage to mating guide parts provides reliable disk member movement, while utilizing a preferable means to guide the disk member during valve cycling. Also, the disk member remains in alignment with the inlet, thus avoiding impact damage on the spherical sealing face of the disk member as the disk member closes upon the valve seat.

In the improved safety relief valve, as the disk member is removed from a valve seat, fluid flows from the valve inlet into the closed bonnet within the valve housing, where the fluid pressure builds and then flows from the bonnet through a uniform annular area of flow defined by the fixed skirt member and the inlet base. Fluid then flows into a chamber in the lower valve housing and exits through the outlet. The uniform annular area of flow created by the skirt member and inlet base enables the formation of a uniform pressure environment around the disk member within the bonnet. The flow forces generated by fluid exiting the outlet do not shift the disk member, since the detrimental sideways flow forces are not transferred past the uniform annular area of flow and into the bonnet. The pressurized environment in the bonnet remains stable, which keeps the disk member and stem member centralized in relation to the valve seat and guide member bore. Damage to parts is removed and alignment is maintained between the mating parts during the cycling of the disk member.

One benefit of having the moveable parts aligned during valve cycling is that mating guide part tolerances can be increased and smaller sized guide parts can be utilized, making the valve more economical to manufacture. Another benefit of the aforementioned disk member and skirt member arrangement is that the skirt member serves to protect the disk member and inlet base from damaging objects that may enter though the valve outlet. This is especially advantageous when the valve is attached to a shared vent pipe, where many valve outlets are connected onto a single vent pipe, and debris can enter the outlet side of the attached valves during valve cycling. The present invention provides measurable improvement over the valves of the '506 and '955 patents.

In one aspect of the invention, an improved safety relief valve designed for use on a pressure vessel or a flow line with a pressurized fluid therein is provided. The safety relief valve includes a valve body attachable to the pressure vessel or flow line, the valve body comprising an inlet base with an inlet, a housing with an outlet, a closed bonnet within the housing with an attached guide member with a guide bore therein. The safety relief valve also includes a disk member closable on a valve seat between the inlet and the disk member, and a stem member attached to the disk member. Further, the safety relief valve includes a mechanism in the body biasing the disk member to rest on the valve seat with a set force, such that when the pressure in the pressure vessel or flow line exceeds a set pressure resulting from the set force, the disk member is lifted from the valve seat. The safety relief valve includes a fixed skirt member that defines a uniform annular area of flow with the inlet base. An improvement on the valve comprises the use of a uniform annular area of flow to create a stable pressurized environment around the disk member to maintain disk member and stem member alignment with the guide bore and valve seat during valve venting cycles.

In a second aspect of the invention, an improved safety relief valve is provided. The safety relief valve has a valve body comprised of an inlet base with an inlet and a housing with an outlet, a closed bonnet and a chamber within the housing, a disk member with an attached stem member closable on a valve seat between the inlet and the disk member, a mechanism biasing the disk member on the valve seat, a guide member with a longitudinal guide bore attached to the housing, and a fixed skirt member. An improvement on the valve comprises the use of the skirt member, inlet base, and guide member in combination with a disk member with an unrestricted annular passage located around the outer diameter of the disk member. The skirt member defines a uniform annular area of flow with the inlet base through which fluid does pass after the disk member is fully removed from the valve seat. Use of an unrestricted annular passage around the outer diameter of the disk member lends itself to reliable motion in the disk member, and it enables pressure on the front side of the disk member to be immediately communicated to the space on the back side of the disk member after the disk member is removed from the valve seat. Pressure does build on the backside of the disk member to assist in disk member closure on the inlet, but there is no delay in pressure communication from the back side of the disk member to the front side of the disk member. There are no close-fit passages around the outer diameter of the disk member to be coated with debris when the disk member is removed from the inlet and fluid enters the closed bonnet. Disk member freeze-up is avoided, and the amount of pressure necessary to open the valve is unaffected, making valve performance more predictable. The present invention provides measurable improvement over the valves of the '057 and '838 patents.

The present invention provides the foregoing and other features; the advantage of the invention over prior art valves does become further apparent from the following detailed description of the embodiments, read in conjunction with the accompanying drawings. The detailed description and drawings are merely illustrative of the invention and do not limit the scope of the invention, which is defined by the appended claims and equivalents thereof.

DETAILED DESCRIPTION OF THE DRAWINGS AND OF THE EMBODIMENTS OF THE INVENTION

Figure 1:
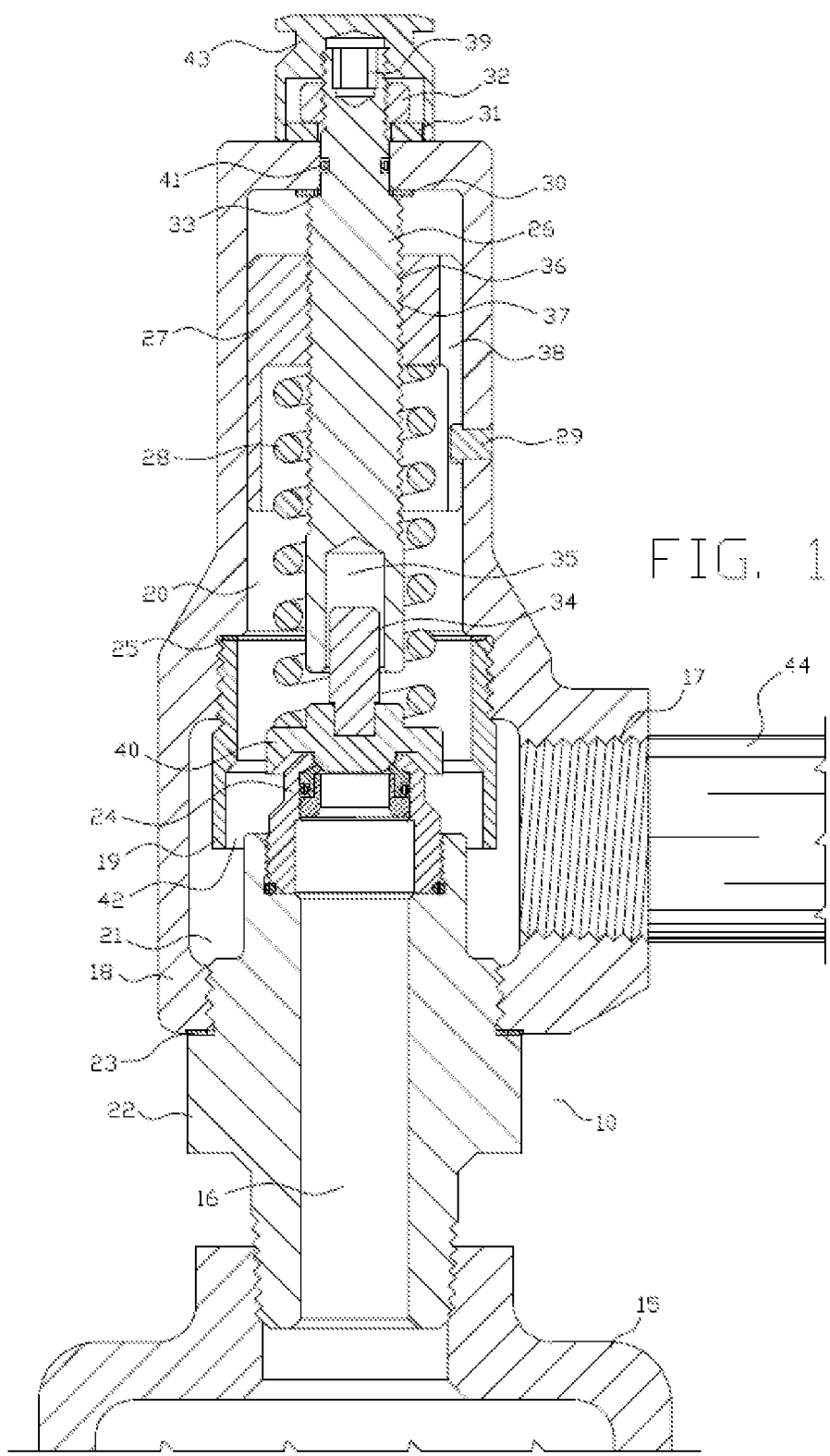
FIG. 1 is a cross-sectional view of a first embodiment of a safety relief valve in a closed position.

Referring to FIG. 1, a safety relief valve 10 is shown in a closed position. The safety relief valve 10 is removably affixed to a pressure vessel 15. Any method known in the art can be used to removably affix the safety relief valve 10 to the pressure vessel 15. Preferably, a threaded engagement is used. Nuts, bolts, screws, adhesives, and friction fitting may also be used.

The safety relief valve 10 has a valve body made of two parts, an inlet base 22 and a housing 18. A soft metal washer 23 is placed between the inlet base 22 and the housing 18 to seal the connection as the parts are screwed together. The inlet base 22 has male threads on its bottom so that the safety relief valve 10 can be threaded onto the pressure vessel 15. The inlet base 22 has an inlet 16 through which fluids pass from the pressure vessel 15 into the housing 18. The housing 18 defines a bonnet 20 therein, a chamber 21 therein, and an outlet 17. The outlet 17 has female threads to which a pipe 44 can be attached for conveying fluids discharged through the valve. Preferably, the steel that is used in the inlet base 22 and housing 18 is one or more of commercially available mild steel, stainless steel, carbon steel, or combinations thereof. The material for a particular pressure relief valve 10 may be selected based upon what the safety relief valve 10 is used for, in particular, which fluid is flowing through the safety relief valve 10.

Downstream from and associated with the inlet 16 is a valve seat 24, made up of several components. In the closed position, a disk member 40 removably rests upon the valve seat 24. The disk member 40 includes a sealing surface with the shape of a section of a sphere. Preferably, the disk member 40 is made of steel. Preferably, the steel that is used in the disk member 40 is one or more of commercially available mild steel, stainless steel, carbon steel, and combinations thereof. Generally, these types of disk member 40 and valve seat 24 arrangements are preferred because they provide a reliable valve seal after repeated valve cycling.

When the disk member 40 rests on the valve seat 24, fluid cannot escape from the pressure vessel 15, through the inlet 16, and pass the valve seat 24. The disk member 40 rests on valve seat 24 in the closed position because a user has adjusted a mechanism to bias the disk member 40 to stay closed on the valve seat 24. Preferably, the mechanism is a guide screw 26, which acts, directly or indirectly, against a spring 28 to hold the disk member 40 on the valve seat 24. For example, in FIG. 1, the guide screw 26 is supported on a bearing 30, which contacts the top of the housing 18. A hexagonal hole 39 is provided to enable rotation of the guide screw 26. An o-ring 41 provides a seal between the housing 18 and the guide screw 26. The guide screw 26 has a shoulder 33 contacting the bearing 30. The shoulder 33 prevents the guide screw 26 from traveling longitudinally upward inside the housing 18. The force exerted by the spring 28 is transferred to a bushing 27 and onto the guide screw 26, which keeps the shoulder 33 against the bearing 30, and prevents the guide screw 26 from moving longitudinally downward. The bushing 27 is inside the housing 18 and rides up and down on the guide screw 26 as bushing threads 36 engage guide screw threads 37. To prevent the bushing 27 from rotating, the bushing 27 has an axial slot 38 located on its outer diameter through which a pin member 29 extends. The pin member 29 is rigidly attached to the housing 18 by an interference fit. Thus, the guide screw 26 is supported in the housing 18 to allow rotational, but not longitudinal movement. A nut 32 and a washer 31 are used to lock the rotational position of the guide screw 26. A cap 43 is used to protect the threaded upper section of the guide screw 26 from external damage.

The amount of force that the guide screw 26, the bushing 27, and the spring 28 apply against the disk member 40 produces a set pressure. Although the guide screw 26 and the spring 28 are preferred, the set pressure can be adjusted using any mechanism known in the art.

The guide screw 26 is particularly preferred because it has a longitudinal bore 35 therein. When the disk member 40 is removed from the valve seat 24, the bore 35 provides a path of movement for a stem member 34 permanently affixed to the disk member 40. The stem member 34 is attached to the disk member 40 by an interference fit, but any mechanism known in the art can be used. The guide screw 26 and disk member 40 arrangement minimizes the possibility of debris buildup and contamination of moving parts during fluid flow out of the safety relief valve 10.

When the pressure inside the pressure vessel 15 exceeds the valve set pressure, the safety relief valve 10 opens. Specifically, fluid comes through the inlet 16, past the valve seat 24, and applies an upward force to the disk member 40. When the upward force exceeds the down forces acting on the disk member 40, including the set pressure, the disk member 40 is lifted from the valve seat 24 and guided upward. Note that the upward/downward language is used to describe the orientation of embodiment of the pressure relief valve 10 shown in FIG. 1. The safety relief valve 10 could be designed so that the disk member 40 moved horizontally rather than vertically, or in another direction. When the disk member 40 is lifted from the valve seat 24, fluid escapes from the inlet 16, passes around the disk member 40, and flows into the bonnet 20. When the disk member 40 is fully lifted against the guide screw 26, fluid flows from the bonnet 20, past the disk member 40, through a uniform annular area of flow 42 defined by the inlet base 22 and a skirt member 19, into the chamber 21 of the housing 18, and is exhausted out of the outlet 17.

The skirt member 19 is preferably made of steel. Preferably, the steel that is used in the skirt member is one or more of commercially available mild steel, stainless steel, carbon steel, and combinations thereof. The skirt member 19 is attached to the housing 18 of the safety relief valve 10 by a threaded engagement, but any mechanism known in the art, including friction fitting or the application of adhesive substances can be used to attach the skirt member 19. A soft metal washer 25 is placed between the housing 18 and the skirt member 19 to create a seal for the connection.

In FIG. 1, the skirt member 19 is attached to the housing 18 and creates the uniform annular area of flow 42 between the skirt member 19 and the inlet base 22. The uniform annular area of flow 42 is sized appropriately, so that built-up back pressure in the bonnet 20 does not adversely affect flow coming from the inlet 16. Those of ordinary skill in the art understand the limitations imposed by built-up back pressure for a particular safety relief valve 10.

Specified service conditions include, but are not limited to the fluid being relieved through the safety relief valve 10, the temperature at which the safety relief valve 10 is run, the maximum pressure of the pressure vessel 15 to which the safety relief valve 10 is attached (which is related to the set pressure), the size of the inlet 16 and the outlet 17, the material of the inlet base 22, the material of the valve seat 24, the maximum flow capacity of the safety relief valve 10, the length of piping 44 attached to the outlet 17, etc. Those of ordinary skill in the art understand the various specified service conditions for a particular safety relief valve 10.

For example, a fluid used in a typical installation might be air, water, carbon dioxide, propane, or another fluid. Temperature during operation of the safety relief valve 10 may be 100 degrees Fahrenheit at the seat 24 and 70 degrees Fahrenheit at the outlet 17. A typical set pressure might be 200 psig.

Figure 2:
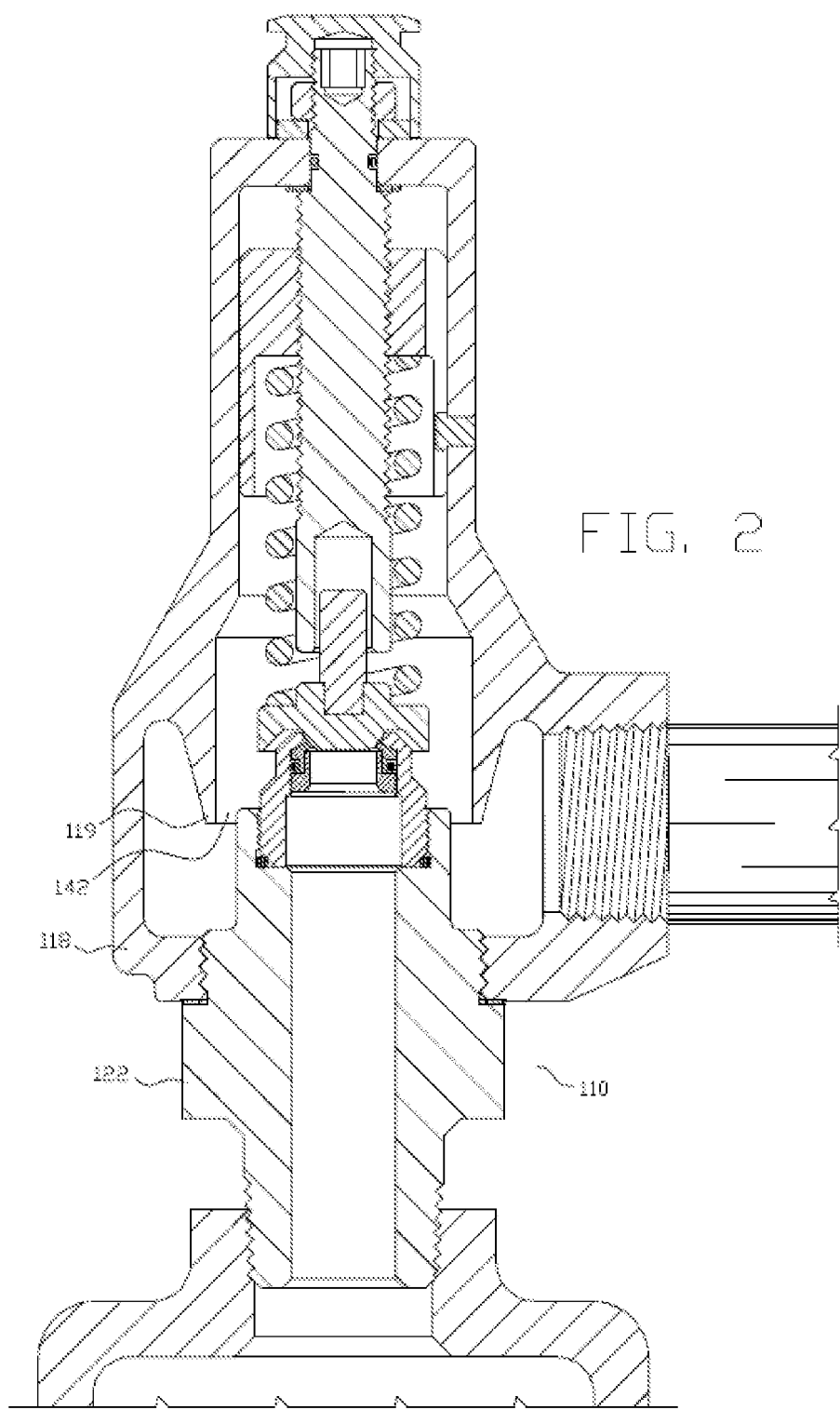
FIG. 2 is a cross-sectional view of a second embodiment of a safety relief valve in a closed position.

For a particular installation, certain operating conditions may involve ranges. For example, the safety relief valve 10 may be specified to operate at any temperature within a range of temperatures. Often, the valve manufacturer specifies ranges of operating conditions for which their valves are designed. Referring to FIG. 2, another embodiment of a safety relief valve 110 is shown. The safety relief valve 110 is substantially identical to the safety relief valve 10 in FIG. 1, except the safety relief valve 110 uses a housing 118 with an integral skirt 119 to create a uniform annular area of flow 142 with an inlet base 122.

Figure 3:
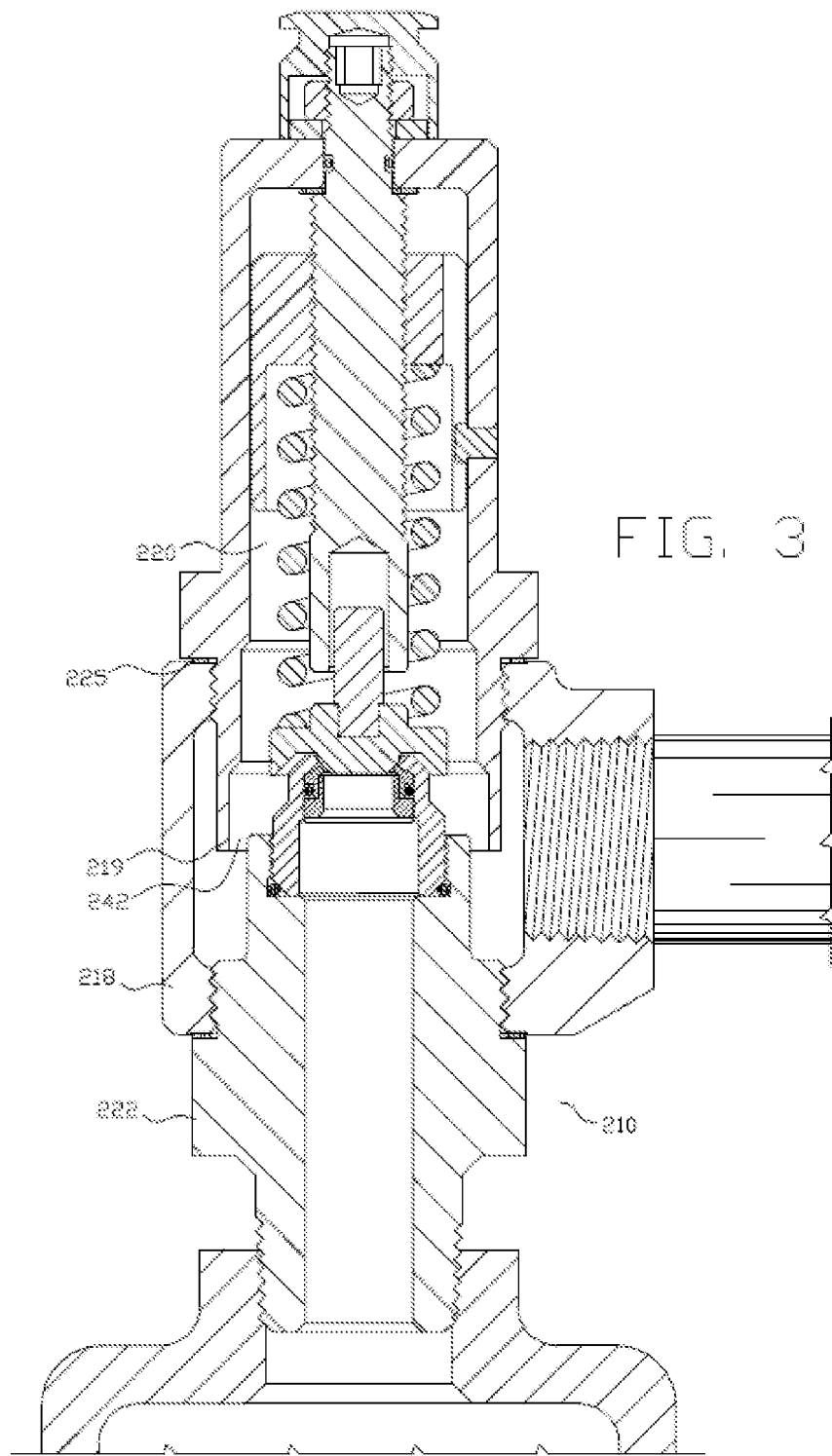
FIG. 3 is a cross-sectional view of a third embodiment of a safety relief valve in a closed position.

Referring to FIG. 3, another embodiment of a safety relief valve 210 is shown. The safety relief valve 210 is substantially identical to the safety relief valve 10 in FIG. 1, except the safety relief valve 210 uses a bonnet 220 with an integral skirt 219, which is screwed onto a housing 218, to create a uniform annular area of flow 242 with an inlet base 222. The safety relief valve 210 uses a soft metal washer 225 to provide a seal between the bonnet 220 and the housing 218.

Figure 4:
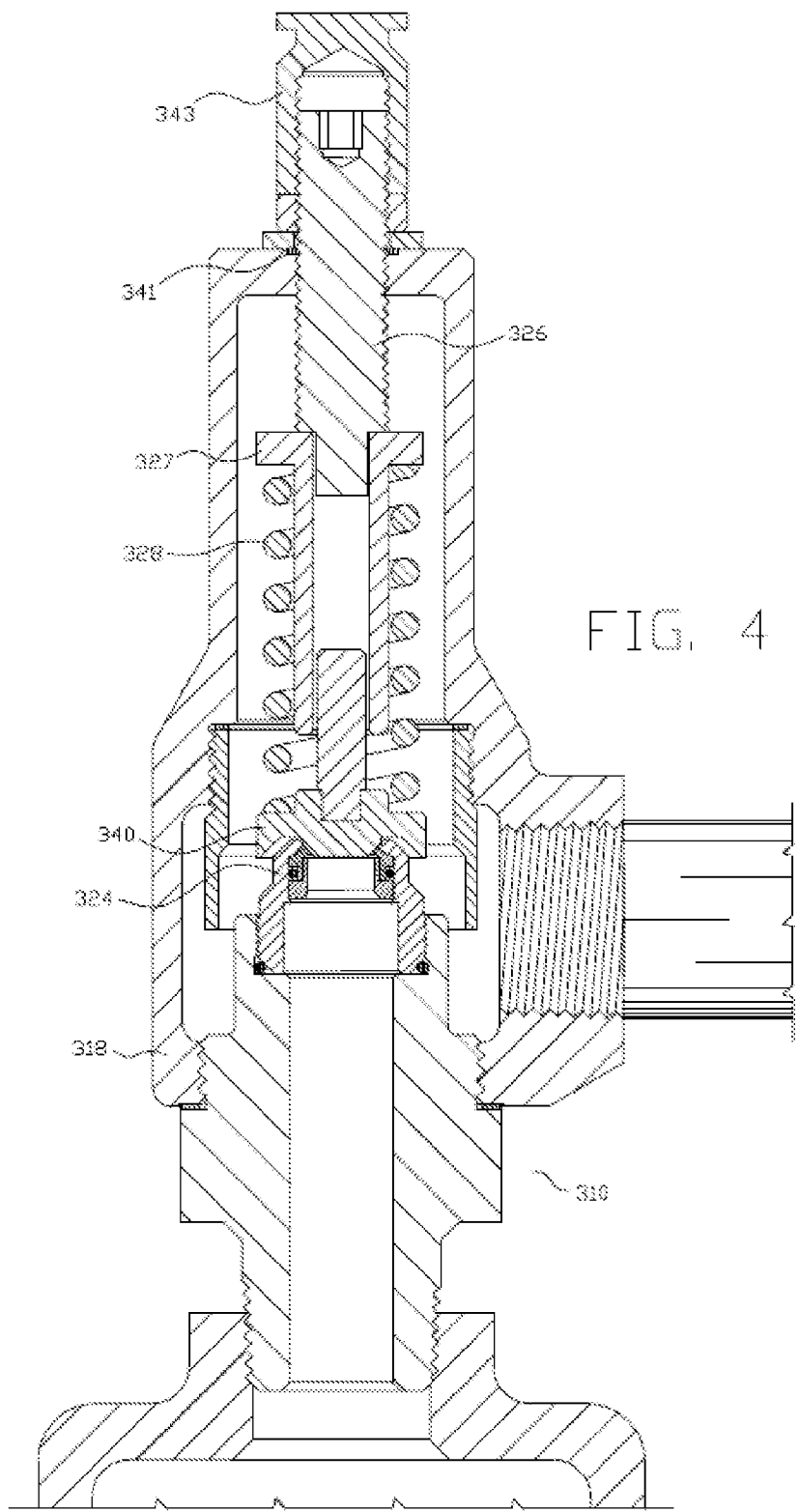
FIG. 4 is a cross-sectional view of a fourth embodiment of a safety relief valve in a closed position.

Referring to FIG. 4, another embodiment of a safety relief valve 310 is shown. The safety relief valve 310 is substantially identical to the safety relief valve 10 in FIG. 1, except the safety relief valve 310 utilizes a different disk member guidance arrangement. The safety relief valve 310 has a set screw 326 threaded onto a housing 318 with an attached guide member 327, a thread seal 341, and a cap 343. The set pressure is adjusted by rotating the set screw 326, which moves the guide member 327 longitudinally upward and downward inside the housing 318, which results in changing the amount of compression on a spring 328, which acts on a disk member 340 to close on a valve seat 324.

Figure 5:
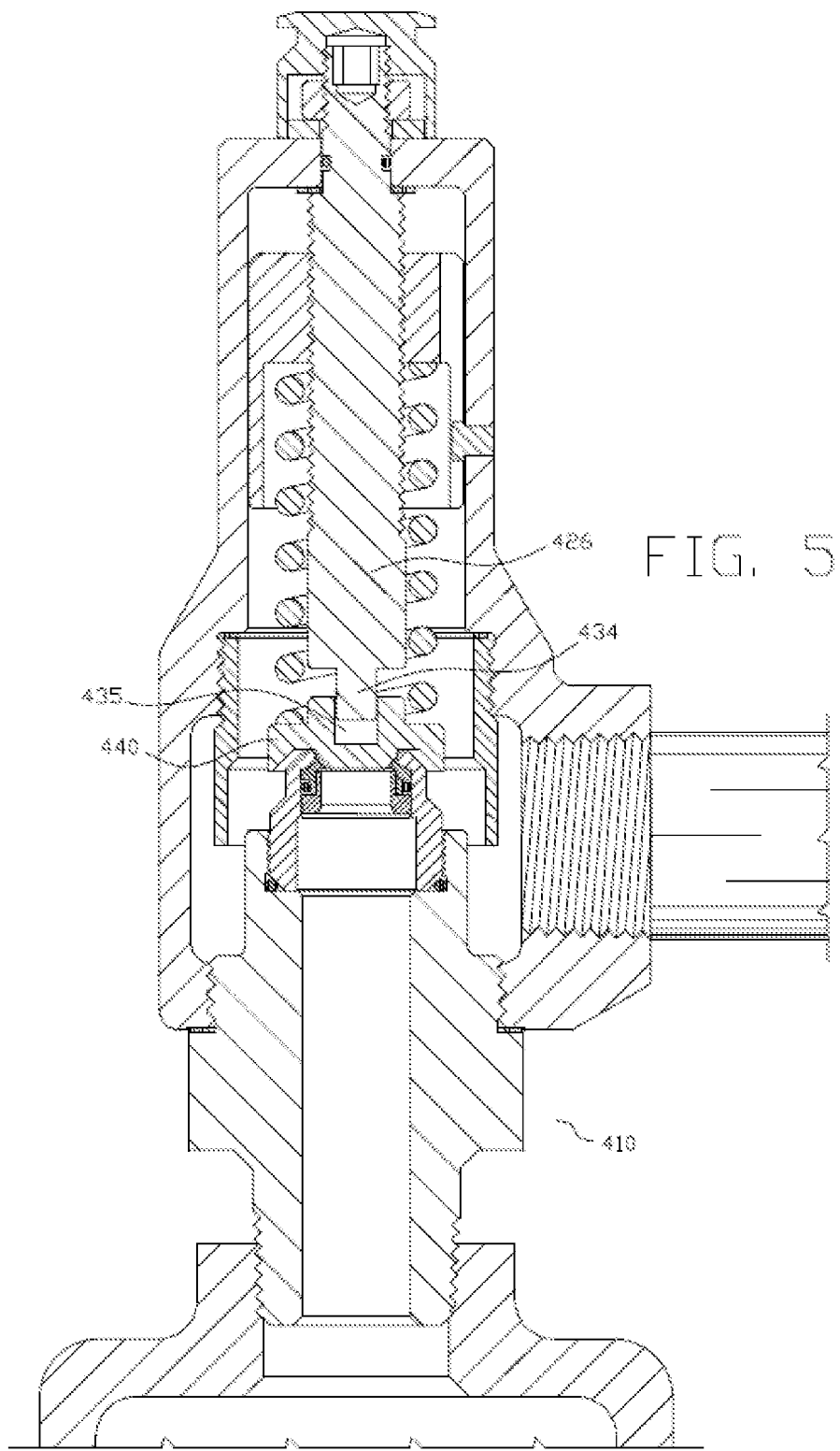
FIG. 5 is a cross-sectional view of a fifth embodiment of a safety relief valve in a closed position.

Referring to FIG. 5, another embodiment of a safety relief valve 410 is shown. The safety relief valve 410 is substantially identical to the safety relief valve 10 in FIG. 1, except the safety relief valve 410 utilizes a different disk member guidance arrangement. A disk member 440 has a longitudinal bore 435 machined on the back side, which accepts a stem member 434 integral to a guide member 426. The stem member 434 and longitudinal bore 435 serve to guide the disk member 440 during valve cycling.

Figure 6:
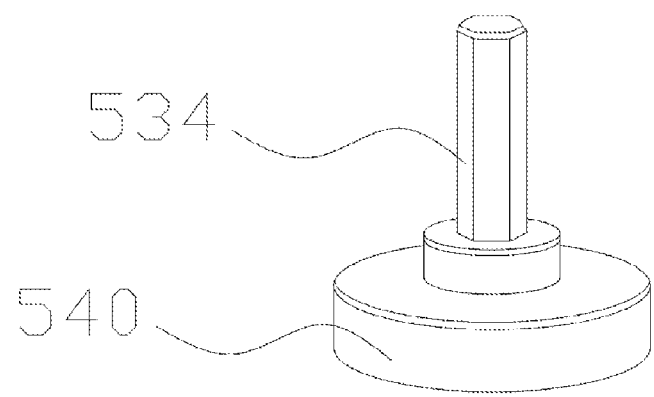
FIG. 6 is a side view of a hexagonal stem and round disk arrangement that can be used with any of the safety relief valves of FIG. 1-4.

Referring to FIG. 6, a hexagonal stem member 534 and a round disk member 540 arrangement is shown. This disk arrangement can be used with any of the safety relief valves of FIGS. 1-4.

It should be appreciated that the apparatus of the present invention is capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention is therefore indicated by the appended claims rather than by the foregoing description. All changes that come within the meaning and range of equivalency of the claims are embraced to be within their scope.

The invention claimed is:
1. A safety relief valve comprising:
   a) a valve body with an inlet and an outlet;
   b) a valve seat positioned within said valve body between said inlet and said outlet;
   c) a disk member coacting with said valve seat to close said inlet and thereby shutoff communication between said inlet and said outlet, said disk member with a front side facing said valve seat and a back side;
   d) a resilient member urging said disk member into seated closure on said valve seat;
   e) said disk member being relatively movable responsive to said resilient member and to inlet pressure coacting on the front of said disk member;
   f) an annular fixed skirt member attached to said valve body surrounding said disk member with said inlet positioned at a height within said valve body, a distal end of said skirt member extending downwardly past said height of said inlet with an inner diameter of said skirt member partially overlapping an outer diameter of said inlet, such that said inner diameter of said skirt member and said outer diameter of said inlet define an annular flow area concentric to said inlet, disposed below said disk member, and perpendicular to said outlet, wherein said skirt member does not contact said inlet and said flow area is the sole communication to said outlet from said inlet past said valve seat and said disk member;
   g) said skirt member being spaced from said disk member to provide a passage therebetween so that changes in pressure on the back side of said disk member are in immediate communication with pressure on the front side of said disk member at all times;
   h) said flow area controlling pressure buildup in said valve body while said disk member is removed from said valve seat, enabling said disk member to movably function and remain concentric to said inlet and said valve seat as said flow area directs fluid flow to said outlet.

2. The safety relief valve of claim 1 wherein said resilient member comprises a spring being directly acted against by a guide member.

3. The safety relief valve of claim 1 wherein said resilient member comprises a spring being acted against, indirectly, by a guide member.

4. The safety relief valve of claim 3 further comprising a connecting means for connecting said guide member with said disk member such that said connecting means aligns said disk member with said inlet.

5. The safety relief valve of claim 4 wherein said guide member includes a longitudinal bore and said disk member includes a stem member, and said connecting means comprises said stem member slidably mounted within said longitudinal bore of said guide member.

6. A safety relief valve with an adjustable relief set pressure comprising a valve body with an inlet and an outlet, said valve body comprising a closed bonnet therein, a valve seat between said inlet and a disk member, and a spring acting on said disk member to force said disk member against said valve seat; said safety relief valve comprising:
   a) a guide member supported in said valve body to allow rotational, but not longitudinal movement of said guide member with respect to said valve body;
   b) a bushing member supported within said valve body to impart changes in compression of said spring by movement of said guide member;
   c) a fixed skirt member surrounding and concentric to said disk member, said skirt member having an inner diameter larger than and extending partially over an outer diameter of said inlet, thereby defining an annular flow area, wherein said skirt member does not contact said inlet and said flow area is concentric to said inlet, disposed underneath said disk member, and located at an angle of approximately 90 degrees in relation to said outlet;

d) a passageway between said skirt member and said disk member whereby changes in pressure on a back side of said disk member are in immediate communication with a front side of said disk member at all times;

e) said flow area controlling pressure buildup in said valve body and directing fluid flow towards said outlet as said safety relief valve opens and closes;

f) said disk member having a centerline axis remaining axially aligned with a centerline axes of said inlet and said valve seat as said safety relief valve opens and closes.

7. The safety relief valve of claim 6 further comprising a connecting means for connecting said guide member with said disk member, said connecting means and said spring providing the sole contact with said disk member to align said disk member with said inlet.

8. The safety relief valve of claim 7 wherein said guide member includes a longitudinal bore, and said connecting means comprises a stem member slidably mounted within the longitudinal bore of said guide member.

9. The safety relief valve of claim 8 wherein said spring comprises a helical spring and wherein said guide member fits within the annulus of said helical spring and has a diameter sufficiently close to an inside diameter of said helical spring to provide inside diameter guiding.

10. An adjustable set pressure safety relief valve designed for use on a pressure vessel or a flow line with a pressurized fluid therein, said safety relief valve comprising:
 a) a valve body with an inlet and an outlet;
 b) a valve seat between said inlet and a disk member;
 c) said disk member configured to seal off the flow of fluids through said safety relief valve at said valve seat;
 d) said disk member including a stem member;
 e) a spring acting on said disk member to force said disk member against said valve seat;
 f) a guide member rigidly supported in said valve body to allow rotational but not longitudinal movement of said guide member with respect to said valve body, said guide member including a longitudinal bore into which said stem member slidably fits so that said disk member is aligned with said inlet by a longitudinal sliding connection between said guide member and said stem member;
 g) said guide member providing an abutting surface which limits the lift of said disk member from said valve seat;
 h) a bushing member connected to said guide member and mounted within said valve body such that rotational movement of said guide member produces longitudinal movement of said bushing member with respect to said guide member, said bushing member also including a close sliding relationship with the inside walls of said valve body such that said bushing member provides centering of the lower portion of said guide member within said valve body;
 i) said spring comprising a helical spring biased between said bushing member and said disk member;
 j) said guide member fitting within the annulus of said helical spring with an outer diameter sufficiently close to an inside diameter of said helical spring to provide inside diameter guiding;
 k) a skirt member disposed within said valve body, wherein said skirt member does not contact said inlet, said skirt member being axially aligned with said disk member and said inlet having a flow area concentric to said inlet, wherein said flow area is defined by an inner diameter of said skirt member and an outer diameter of said inlet with said inner diameter of said skirt member partially covering said outer diameter of said inlet, wherein said flow area is disposed beneath said disk member and is perpendicular to said outlet;
 l) a fluid passageway between said skirt member and said disk member whereby changes of pressure on a back side of said disk member are at all times communicated without delay to the space on a front side of said disk member;
 m) said disk member having a centerline axis remaining axially aligned with a centerline axes of said inlet, said valve seat, and said guide member while said safety relief valve operates;
 n) said flow area controlling pressure buildup in said valve body and directing fluid flow towards said outlet while said disk member is removed from said valve seat.

* * * * *